(No Model.)
J. COUGHLIN & W. CURTIS.
WHEEL FENDER FOR WAGONS.
No. 367,191. Patented July 26, 1887.
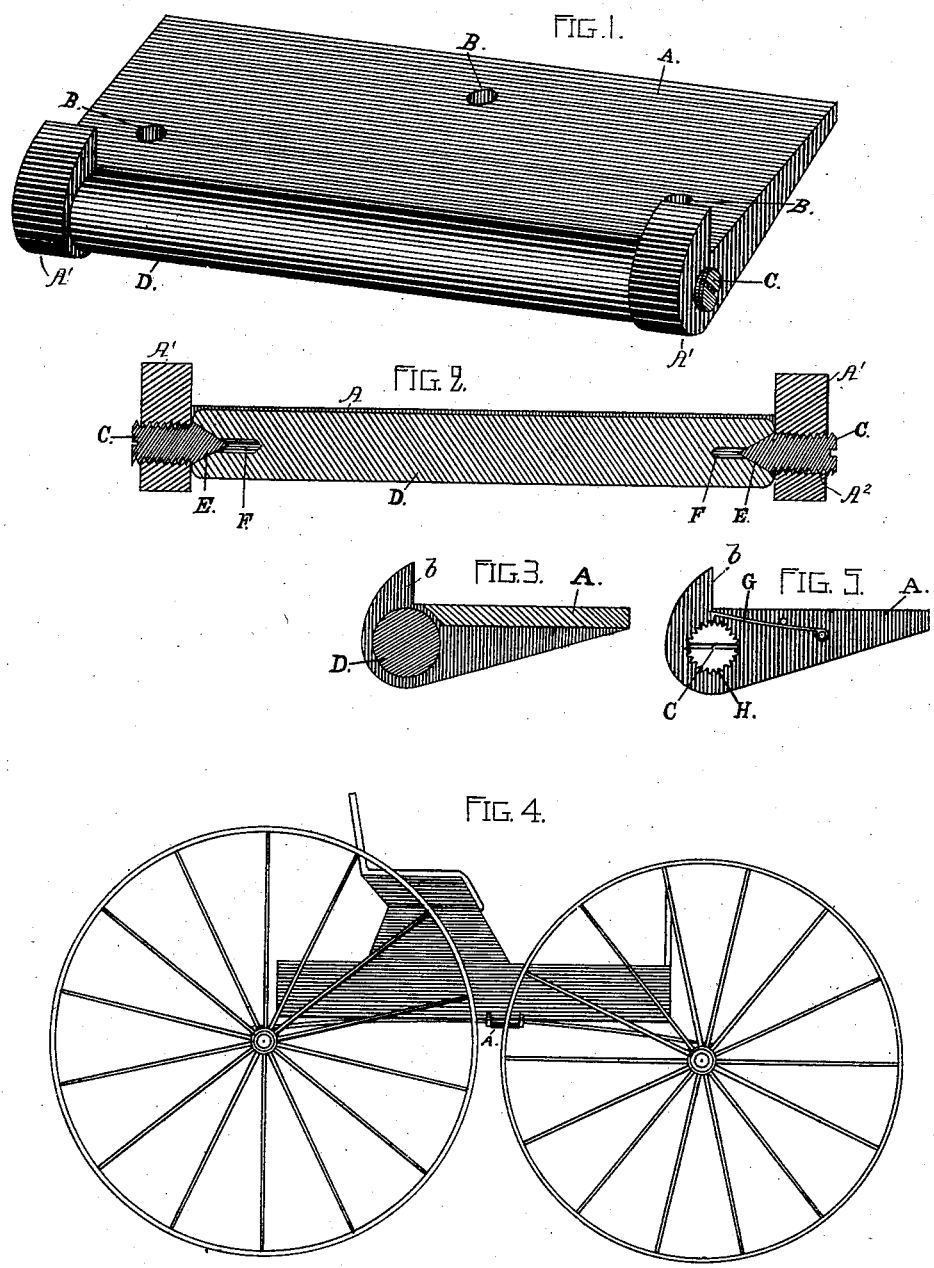
ATTEST,
John H. Redstone
Albert E. Redstone,
INVENTORS,
Jeremiah Coughlin
Winfield Curtis

UNITED STATES PATENT OFFICE.

JEREMIAH COUGHLIN AND WINFIELD CURTIS, OF OAKLAND, CALIFORNIA.

WHEEL-FENDER FOR WAGONS.

SPECIFICATION forming part of Letters Patent No. 367,191, dated July 26, 1887.

Application filed November 11, 1886. Serial No. 218,537. (No model.)

*To all whom it may concern:*

Be it known that we, JEREMIAH COUGHLIN and WINFIELD CURTIS, citizens of the United States, residing in the city of Oakland, in the county of Alameda and State of California, have invented a new and useful Anti-Friction Shield and Wheel-Protector for Wagons, of which the following is a specification.

Our invention relates to improvements in anti-friction rolls and wheel-protectors for wagons and other vehicles. It will be understood by reference to the accompanying drawings and the letters referring thereto.

Figure 1 is a perspective view of our improved anti-friction roll and wheel-protector; Fig. 2, a longitudinal sectional view of the same as Fig. 1; Fig. 3, a cross-section, and Fig. 4 a side elevation, of a buggy with our invention attached. Fig. 5 is a section showing one mode of preventing the set-screw journal C from turning by means of the teeth H and catch G.

A represents the frame or attaching-plate, which is flat, and is designed to be secured to the under side of the body of the wagon or body. This plate is formed at its outer corners with lugs A', which have threaded openings A², to receive bearing-screws, and said lugs extended above the upper face of the plate A, forming shoulders $b$, which, when the plate A is secured to the under side of the buggy, bear against the side of the latter and serve as stops.

B represents the screw-holes.

C represents the set-screws forming the bearings, and which engage the threaded opening A².

D represents the roll.

E represents the conical point of the set-screw; F, the recess to allow for the wear of the conical bearing, and also for an oil-cup; G, the catch, and H the notched rim for holding the set-screw journal C from turning and loosening.

We form the bed plate A either of cast or malleable iron, and cut the thread to receive the set-screws C, which have the bevel or conical bearings E.

We form the set-screws C of steel of the best quality for durability. The roll D is also formed of steel, in which we form the convex bearings, which conform to the conical bearings of the set-screws C.

We form the set-screws C with the notched rim H, (shown in Fig. 5,) to receive the catch G and hold the same from working out and loosening the bearing of the roll.

We place our improved anti-friction roll and wheel-protector upon the buggy or vehicle as shown in Fig. 4.

The operation is as follows: As the buggy is cramped and the wheel brought to the bed, it strikes against the anti-friction roll D, which revolves and relieves the friction, thus allowing the buggy to move freely while the wheel is in contact, and also fully protecting the same from wear.

Having thus described our invention, what we claim, and desire to secure by Letters Patent, is, in anti-friction rolls and carriage-bed protectors—

1. The combination, with the flat bed-plate A, provided with openings B, and having lugs provided with openings, of a roll, D, having conical openings in its ends, said openings being provided with recesses, as described, and the screws C, engaging the openings A², and having the conical bearing ends E, substantially as described.

2. The combination, with the flat plate A, having the lugs A', provided with threaded openings and extended above the plate A to form shoulders $b$, of the roll D, having conical openings in its ends and recesses, as described, and the screws C, having the conical ends, substantially as described.

JEREMIAH COUGHLIN.
WINFIELD CURTIS.

Witnesses:
JOHN H. REDSTONE,
L. E. REDSTONE.